(12) United States Patent
Field (10) Patent No.: US 9,130,830 B2
(45) Date of Patent: *Sep. 8, 2015

(54) METHOD FOR DETECTING VIDEO TILING

(75) Inventor: Brian E. Field, Evergreen, CO (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 261 days.

This patent is subject to a terminal disclaimer.

(21) Appl. No.: 13/568,116

(22) Filed: Aug. 6, 2012

(65) Prior Publication Data

US 2012/0300643 A1     Nov. 29, 2012

Related U.S. Application Data

(63) Continuation of application No. 12/049,511, filed on Mar. 17, 2008, now Pat. No. 8,259,594.

(51) Int. Cl.
*H04L 12/42* (2006.01)
*H04L 12/24* (2006.01)
*H04L 12/18* (2006.01)
(Continued)

(52) U.S. Cl.
CPC ............ *H04L 41/0631* (2013.01); *H04L 12/18* (2013.01); *H04L 12/1868* (2013.01); *H04L 41/064* (2013.01); *H04L 41/069* (2013.01); *H04L 41/0677* (2013.01); *H04L 43/0823* (2013.01); *H04L 43/067* (2013.01); *H04L 43/0811* (2013.01); *H04L 43/0817* (2013.01);
(Continued)

(58) Field of Classification Search
CPC . H04L 12/1868; H04L 43/0823; H04L 12/18; H04L 41/631; H04L 41/064; H04L 41/069

USPC .......................................................... 370/432
See application file for complete search history.

(56) References Cited

U.S. PATENT DOCUMENTS 6,538,997 B1    3/2003   Wang et al.
6,766,368 B1    7/2004   Jakobson et al.
(Continued)

FOREIGN PATENT DOCUMENTS

WO          9532411 A1     11/1995
WO          0176266 A1     10/2001
(Continued)

OTHER PUBLICATIONS

Dave Thaler Microsoft Bernard Aboba Microsoft: "Multicast Debugging Handbook; draft-ietf-mboned-mdh-05.txt", Nov. 20, 2000, XP015022759.

(Continued)

*Primary Examiner* — Omer S Mian
(74) *Attorney, Agent, or Firm* — Banner & Witcoff, Ltd.

(57) ABSTRACT

A method for detecting errors on an audio/video (A/V) data stream in a data service network includes providing multicast components operably coupled to each other via respective links for transmitting the A/V data stream to a user and for defining at least one multicast tree. The method further includes generating a state information signal indicative of a number of errors on the A/V data stream for at least one of the links and at least one of the plurality of multicast components. The method further includes determining the cumulative number of errors on the A/V data stream that are indicative of the number of errors for the at least one of the links and the at least one of the plurality of multicast components in the multicast tree in response to the state information signal.

17 Claims, 4 Drawing Sheets

(51) Int. Cl.
*H04L 12/26* (2006.01)
*H04L 12/70* (2013.01)
*H04L 12/761* (2013.01)

(52) U.S. Cl.
CPC ......... *H04L 45/16* (2013.01); *H04L 2012/5642* (2013.01)

(56) References Cited

U.S. PATENT DOCUMENTS

| | | | |
|---|---|---|---|
| 7,035,217 | B1 | 4/2006 | Vicisano |
| 7,269,536 | B1 | 9/2007 | Gross et al. |
| 7,474,632 | B2 | 1/2009 | Ban |
| 8,259,594 | B2 * | 9/2012 | Field ............................ 370/248 |
| 2003/0046390 | A1 * | 3/2003 | Ball et al. ..................... 709/224 |
| 2004/0088309 | A1 | 5/2004 | Koh et al. |
| 2005/0146426 | A1 | 7/2005 | Pereira et al. |
| 2005/0201278 | A1 | 9/2005 | Banerjee et al. |
| 2005/0204042 | A1 | 9/2005 | Banerjee et al. |
| 2006/0114904 | A1 | 6/2006 | Lee |
| 2006/0159050 | A1 | 7/2006 | Kim et al. |
| 2006/0187950 | A1 | 8/2006 | Bou-Diab et al. |
| 2006/0245364 | A1 | 11/2006 | Zhu et al. |
| 2007/0025276 | A1 | 2/2007 | Zwiebel et al. |
| 2007/0147371 | A1 | 6/2007 | Radha et al. |
| 2007/0177523 | A1 * | 8/2007 | Nagami et al. ................ 370/252 |
| 2007/0225926 | A1 | 9/2007 | Gross et al. |
| 2008/0002693 | A1 | 1/2008 | Moki et al. |
| 2008/0175172 | A1 | 7/2008 | Nishi |
| 2008/0225770 | A1 | 9/2008 | Cho et al. |
| 2008/0229153 | A1 * | 9/2008 | Li et al. ........................... 714/39 |
| 2008/0298229 | A1 | 12/2008 | Ballantyne et al. |
| 2009/0034689 | A1 | 2/2009 | Wahl et al. |
| 2009/0158096 | A1 * | 6/2009 | Ali et al. ......................... 714/43 |
| 2009/0232007 | A1 | 9/2009 | Field |
| 2010/0177641 | A1 * | 7/2010 | Farkas et al. .................. 370/242 |

FOREIGN PATENT DOCUMENTS

| | | |
|---|---|---|
| WO | 0233980 A2 | 4/2002 |
| WO | 2008028413 A1 | 3/2008 |

OTHER PUBLICATIONS

Reddy A et al: "Fault Isolation in Multicast Trees", Computer Communication Review, ACM, New York, NY, US, val. 30, No. 4, Oct. 1, 2000, pp. 29-40, XP001 063484.

MBONED Working Group Kevin Almeroth UCSB Liming WEI Cisco Systems et al: "Justification for and use of the Multicast Routing Monitor (MRM) Protocol; draft-ietf-mboned-mrm-use-OO.txt". 19990226. vol. mboned. Feb. 26, 1999; XP015022764.

Extended European Search Report—EP13182508.5—Mailign Date: Dec. 13, 2013.

EP Extended Search Report, 09250746.6, dated Jul. 13, 2009.

Srinivasan Jagannathan et al., "Using Tree Topology for Multicast Congestion Control," 2001 IEEE, pp. 313-320.

Youngsu Chae et al., "Exposing the network: Support for Topology-sensitive Applications," IEEE Openarch 2000, pp. 65-74.

Ramon Caceres, et al., "Impromptu measurement Infrastructures Using RTP," IEEE INFOCOM 2002, pp. 1490-1499.

Agisilaos-Georgios P. Ziotopoulos, et al., "Estimation of Network Link Loss Rates Via Chaining in Multicast Trees," IEEE 2001, pp. 2517-2520.

Individual Submission W Fenner AT&T Research S Casner Packet Design: "A traceroute facility for IP Multicast.; draft-fenner-traceroute-ipm-01.txt", IETF Standard Working Draft, Internet Engineering Task Force, IETF, CH, No. 1, Feb. 11, 2005.

Anoop Reddy, et al., "Large-Scale Fault Isolation," IEEE Journal on Selected Areas in Communications, vol. 18, No. 5, May 2000.

* cited by examiner

METHOD FOR DETECTING VIDEO TILING

CROSS-REFERENCE TO RELATED APPLICATIONS

This application is a continuation of U.S. patent application Ser. No. 12/049,511, filed Mar. 17, 2008, hereby incorporated by reference as to its entirety.

BACKGROUND

1. Field of the Invention

The embodiments of the invention described herein generally relate to a method for detecting errors on a data stream that may cause video tiles.

2. Background Art

Video tiling is generally defined as blocks or other such impairments present in a video output while displayed which distort a picture that is intended for viewing by a user. Service providers such as video and high speed data service providers struggle in determining the source of the tiles. Video tiling causes customers to believe there are problems with video receivers provided by the service providers. Customers often place service calls with the service providers and require the service providers to inspect and replace the video receivers in the customer's residence or place of business if the video tiling in the video output is substantial. In some cases, the video receiver may be functioning properly, but is nonetheless switched with another video receiver since the service provider is unable to determine the origin of errors within a multicast tree that cause video tiling.

A service provider network may include a number of multicast trees. Any given multicast tree in the network may include one or more video receivers operably coupled to one or more routers and one or more transmission sources. The video receivers, routers, and transmission sources are generally coupled to each via fiber links which span large distances. The transmission source transmits an audio/video (A/V) data stream to the routers via the links. The routers, in turn, direct the A/V data stream over the links to other routers or various video receivers. It is not uncommon while transmitting the A/V data stream for errors which produce video tiling to occur at the transmission source, the router, or the receiver. Such errors may also occur at the various links coupled between the transmission source, routers, and receivers located in the multicast tree. Existing approaches are not capable of providing service technicians the ability to determine the origin of errors in a multicast tree.

BRIEF DESCRIPTION OF THE DRAWINGS

The embodiments of the present invention described herein are recited with particularity in the appended claims. However, other features will become more apparent and the embodiments of the present invention may be best understood by referring to the following detailed description in conjunction with the accompany drawings in which:

DETAILED DESCRIPTION OF THE PREFERRED EMBODIMENT(S)

Figure 1:
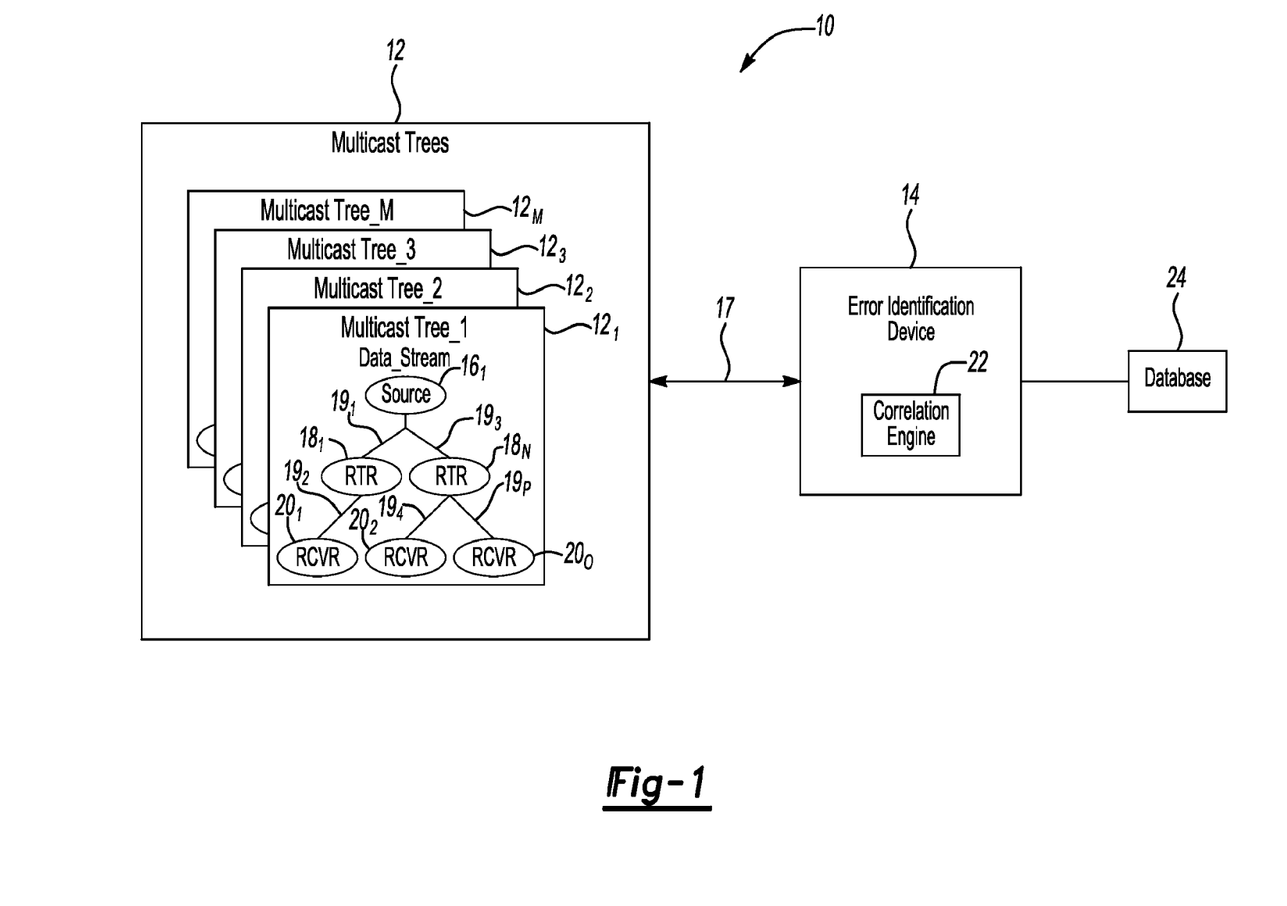
FIG. 1 depicts a system for detecting video tiles in accordance to one embodiment of the present invention.

FIG. 1 depicts a system 10 for detecting video tiling in accordance to one embodiment of the present invention. The exemplary system 10 includes a plurality of multicast trees $12_1$-$12_M$ and an error identification device 14. For any given data service network, a service provider may provide audio visual data or high speed data to the plurality of multicast trees $12_1$-$12_M$. Specific multicast trees may be designated to transmit audio visual data to various zones or regions within a particular country. Each multi cast tree 12 includes a transmission source 16 ($12_1$ has $16_1$, $12_2$ has $16_2$ ... $12_M$ has $16_M$). The transmission source 16 is adapted to generate an A/V data stream. The A/V data stream comprises a plurality of packets. Each packet may include video or audio data (or both).

A plurality of routers $18_1$-$18_N$ are adapted to receive the A/V data stream from each of the source $16_M$. A plurality of receivers $20_1$-$20_O$ are operably coupled to the routers $18_1$-$18_N$. In the illustrated example, the router $18_1$ directs the A/V data stream to the receiver $20_1$. The router $18_N$ directs the A/V data stream to the receivers $20_2$ and $20_O$. The receivers $20_1$-$20_O$ are adapted to present the A/V data to an end user for viewing. The source $16_1$, routers $18_1$-$18_N$, and receivers $20_1$-$20_O$ are generally defined as multicast components within the multicast tree $12_1$ and co-act with each other to transmit the A/V data stream to an end viewer. In general, all references made specifically to the multicast tree $12_1$ generally apply equally to the multicast trees $12_2$-$12_M$. For example, each multicast tree $12_2$-$12_M$ may include any number of multicast components such as the transmission source, the routers, and the receivers. It is generally understood that each multi cast tree $12_1$-$12_M$ may include different or equal amounts of sources, routers, and receivers from one another. Further, the particular arrangement of the sources, routers, and receivers may vary or be similar to one another for each multicast tree $12_1$-$12_M$.

Each multicast component (e.g., 16, $18_1$-$18_N$, and $20_1$-$20_O$) in the multicast trees $12_1$-$12_M$ are operably coupled together via a plurality of fiber links $19_1$-$19_P$. With respect to the exemplary multicast tree $12_1$, the source $16_1$ and the router $18_1$ are coupled together via the link $19_1$. The router $18_1$ and the receiver $20_1$ are operably coupled together via the link $19_2$. The source $16_1$ and the router $18_N$ are operably coupled together via the link $19_3$. The router $18_N$ and the receiver $20_2$ are operably coupled together via the link $19_4$. The router $18_N$ and the receiver $20_O$ are operably coupled together via the link $19_P$. In general, each multicast component transmits the A/V data stream to the next multicast component downstream in the trees $12_1$-$12_M$ via a corresponding link.

In addition, each receiver coupled to the source via a particular router is generally defined as a path within a given multicast tree $12_1$-$12_M$. In the illustrated embodiment, the multicast tree $12_1$ includes a total of three paths. The source $16_1$, the link $19_1$, the router $18_1$, the link $19_2$, and the receiver $20_1$ form a first path. The source $16_1$, the link $19_3$, the router $18_N$, the link $19_4$, and the receiver $20_2$ form a second path. The source $16_1$, the link $19_3$, the router $18_N$, the link $19_P$, and the receiver $20_O$ form a third path. In general, each multicast tree $12_1$-$12_M$ is generally adapted to include one or more paths for transmitting the A/V data stream to a user for viewing. Each link or path within a corresponding multicast tree $12_1$-$12_M$ may span thousands of kilometers for a given region or part of the country. Errors attributed to the transmission of the A/V data stream within the network (e.g., from a source to a router and/or from a router to a receiver via corresponding links) in any given path may generate errors that may cause video tiling at a given receiver. In addition, a number of video impairments (or video tiling) may be due to fabric errors. Each router generally includes one or more interfaces (or line cards). A fabric (or communication path) is generally present between all line cards. Video tiling events may be caused due to problems on the fabric(s) present between the line cards. In some instances, the fabric may include intermittent transmission problems. Such problems may cause packet corruption or lead to packet(s) being dropped as the packet is transmitted from one line card to another (e.g., all line cards internal to the same router).

The error identification device 14 is operably coupled to the multicast trees $12_1$-$12_M$ via a data communication line 17. The error identification device 14 is configured to determine the cumulative number of errors present within each link, path, and/or router of the multicast trees $12_1$-$12_M$ so that service technicians can determine the growth of errors in a particular multicast tree $12_1$-$12_M$ over any period of elapsed time. As note above, errors related to the router may be fabric errors. Such errors (transmission errors on the links and/or paths, and fabric errors associated with the routers) may contribute to the presence of video tiling at a receiver. With respect to the multicast tree $12_1$, each router $18_1$-$18_N$ is configured to transmit a state information signal for every directly connected link in the multicast tree $12_1$ to the error identification device 14 via the data communication line 17.

The state information signal includes the number of packets transmitted and received from each multicast component (e.g., $16_1$, $18_1$-$18_N$, $20_1$-$20_O$) for the corresponding link and the number of packets received at each multicast component over the corresponding link with an error for every path in the multicast tree $12_1$. For example, the router $18_1$ may provide the number of packets successfully transmitted from the source $16_1$ to the router $18_1$ and the number of packets with errors received by the router $18_1$ to the error identification device 14 with the state information signal. The router $18_1$ may also provide the number of packets transmitted from the router $18_1$ to the receiver $20_1$ with an error to the error identification device 14 with the state information signal.

In addition, the router $18_1$ may also include the number of packets that may be dropped due to errors in the state information signal. Such errors may be due to transmission issues (e.g., cyclic redundancy check (CRC) errors), interface overruns (e.g., contention for resources within the routers), transmission issues within each router (e.g., switch fabric errors), or output drops which are caused due to excessive loads on the transmitting interface. The router $18_1$ obtains packet count information (e.g., packets lost due to CRC errors, fabric issues, etc.). As noted above, each router $18_1$ and $18_N$ generally includes a number of interfaces. Multicast content (e.g., A/V data stream) may flow over any one or more of the interfaces to a corresponding router $18_1$ and $18_N$. The routers $18_1$ and $18_N$ perform a CRC error coding scheme which adds redundant bits within the packets of the A/V data stream to indicate which packets in the A/V data stream includes an error for a particular multicast component.

CRC is generally defined as the process whereby a transmitting device embeds a calculation value along with audio and visual data in a packet in a data stream prior to transmitting the data stream. The receiving device repeats a similar calculation to obtain the similar calculation value for comparing the value embedded with the audio and video data in a packet after transmitting the data stream. If both the transmitting device and the receiving device obtain the same result, the particular packet transmitted is assumed to be error free. If the receiving device obtains a different result from that of the transmitting device, an error is presumed to have occurred and the packet is discarded.

In general, the routers $18_1$ and $18_N$ determine when an interface that belongs to a multicast component drops a packet. The routers $18_1$ and $18_N$ may be configured to report abstract errors which may result in packets being dropped. Such errors may be related to errors on the link or errors associated with the routers $18_1$ and $18_N$. Each router $18_1$ and $18_N$ is periodically queried by the error identification device 14 to transmit the state information signal over the data communication line 17 to the error identification device 14.

Each router $18_1$-$18_N$ is also periodically queried by the error identification device 14 to transmit an identification signal over the data communication line 17 to the error identification device 14. Router $18_1$ is generally configured to track packet data received and transmitted on interfaces belonging to the router $18_1$. Likewise, the router $18_N$ is generally configured to track packet data received and transmitted on interfaces that belong to the router $18_N$. In general, each router $18_1$ and $18_N$ provides a local view of the multicast tree by tracking corresponding interfaces (e.g., which belong to each router $18_1$ and router $18_N$, respectively) for incoming and outgoing packets of multi cast content. Each router $18_1$ and $18_N$ transmits the tracked incoming and outgoing packets on a given interface over the identification signal to the error identification device 14. The error identification device 14 includes a correlation engine 22 for assembling the local views provided by each router $18_1$ and $18_N$ into a single end-to-end view (e.g., from source to receiver across each path) to generate an electronic logical representation of the multicast tree $12_1$. In response to generating the logical representation of the multicast tree $12_1$ (e.g., determining corresponding paths from the source to every receiver), the correlation engine 22 also associates the number of packets lost due to error.

The routers $18_1$-$18_N$ are adapted to provide the tracked incoming and outgoing packets on a given interface by executing a protocol independent multicast (PIM) and an internet group membership protocol (IGMP). IGMP is generally defined as a signaling protocol that is used by any one or more of the receivers to express interest in a particular multicast group to a corresponding router. The router $18_1$-$18_N$ use the PIM to build the multicast tree $12_1$-$12_M$ from the receiver back to the transmission source. In general, the routers themselves may not understand what a particular multi cast tree looks like from the source to all receivers. Instead, a single router (or each router) understands the particular interface on which a specific multicast feed is expected to arrive and the interfaces the single router is expected to transmit the multicast content on. The correlation engine 22 gathers this information in response to querying the routers $18_1$-$18_N$. The correlation engine 22 processes and combines this per router information into an end-to-end logical representation for each multicast tree 12-12. A user interface visually displays the logical representation for the multicast tree.

A database 24 is coupled to the error identification device 14 for storing information received via the state information signal and the identification signal. The error identification device 14 is adapted to calculate the cumulative number of errors for any link or path over a predefined time frame in response to receiving the state information signal. The error identification device 14 determines the cumulative number of errors based on errors present in the links, paths and/or the routers. The predefined time frame may correspond to the last N hours or days. The error identification device 14 is further configured to associate the cumulative number of errors for each link and path in the multicast trees $12_1$-$12_M$ after generating the logical representation for each multicast tree $12_1$-$12_M$. This characteristic will be discussed in more detail in connection with FIG. 2. The error identification device 14 allows a user to select a corresponding time frame (e.g., 1 hour, 7 hours, 24 hours, or 7 days) to view the cumulative number of errors for each link and path (via the user multicast component) within a particular multicast tree $12_1$-$12_M$. The errors may be caused or attributed to various overdrive conditions at the multicast components within the routers, or by problematic fiber links in the network.

In general, the source $16_1$ and the receivers $20_1$-$20_O$ are configured to generate alerts as simple network management protocol (SNMP) traps in response to detecting errors while receiving the incoming A/V data stream. The source $16_1$ and/or the receivers $20_1$-$20_O$ transmit the alerts to the correlation engine 22 in response to detecting errors in real time (or asynchronously). The alerts generated by the source $16_1$ and/or the receivers $20_1$-$20_O$ may be indicative of whether a surge of errors are occurring over the network and whether there may be any new errors on any multicast component of the path from the source to the receiver. The correlation engine 22 receives the alerts and determines the particular multicast tree $12_1$-$12_M$ that is impacted and displays such information to service personnel. In response to receiving the alerts, the correlation engine 22 may confirm the operational integrity of the affected multicast component, link or path in any or all of multicast trees $12_1$-$12_M$. If errors on the path from the source to the receiver are confirmed and are temporally aligned with the alerts, then the correlation engine 22 may be adapted to alert service personnel as to the root cause of the errors to allow support personnel to fix or minimize the impact of the link or router errors.

Figure 2:
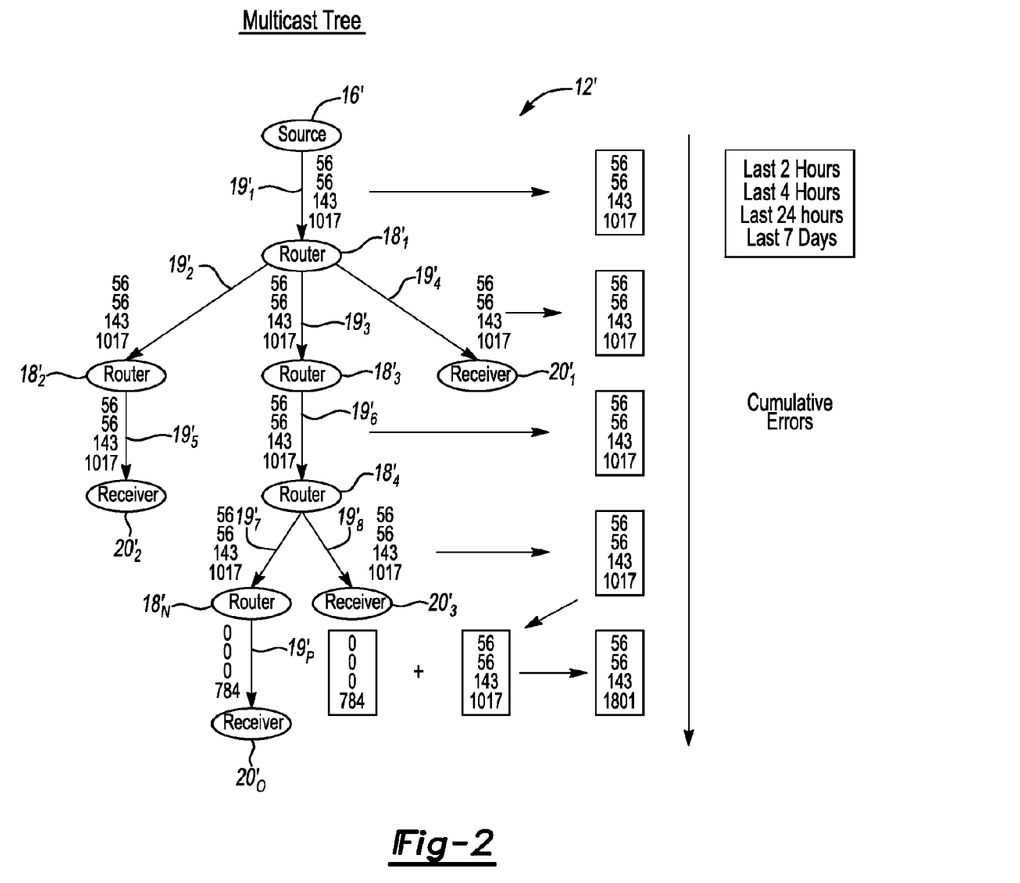
FIG. 2 depicts a logical representation of a multi cast tree generated by the error detection device.

FIG. 2 depicts an example of a logical representation of a multicast tree 12' generated by the error identification device 14. The multicast tree 12' includes a source 16', a plurality of routers $18_1'$-$18_N'$, and a plurality of receives $20_1'$-$20_O'$. The source 16', routers $18_1'$-$18_N'$, and receivers $20_1'$-$20_O'$ are coupled to each other via a plurality of links $19_1'$-$19_P'$. FIG. 2 illustrates that the link $19_1'$ exhibits 56 errors over the last two hour period, 56 errors over the last four hour period, 143 errors over the last twenty-four hour period, and 1017 errors over the last seven day period. No additional errors were detected with respect to links $19_2'$-$19_8'$. FIG. 2 depicts the detection of 784 errors over the last seven day period and no errors for the last two, four, and twenty-four hour periods for the link $19_P'$. In response to detecting number of errors for the link $19_P'$, the error identification device 14 determines that the cumulative number of errors for the path (e.g., $19_1'$-$19_P'$) is 56 errors for the last two hour period, 56 errors for the last four hour period, 143 errors for the last twenty-four hour period, and 1801 errors for the last seven day period. The errors visually displayed next to each link of FIG. 2 may be caused due to issues or errors related to the links, paths, and/or the routers.

Figure 3:
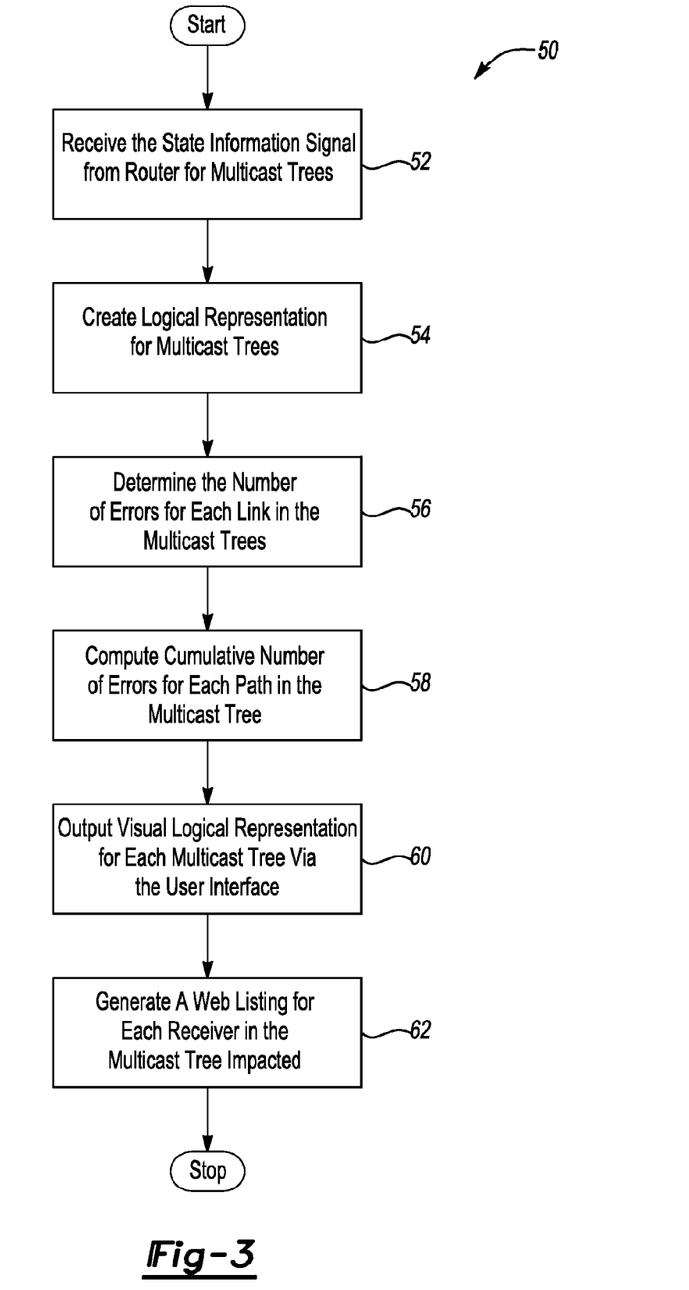
FIG. 3 depicts a method for displaying and reporting the number of error events detected by the system of FIG. 1.

FIG. 3 depicts a method 50 for displaying and reporting errors as detected by the system 10. In general, the method 50 is to be executed prior to utilizing the correlation engine 22 to receive alerts from the source $16_1$ and the receivers $20_1$-$20_O$.

In block 52, the error identification device 14 receives the identification signal from the routers in each multicast tree $12_1$-$12_M$.

In block 54, the error identification device 14 (or the correlation engine 22) creates a logical representation for each multicast tree $12_1$-$12_M$ (including all applicable multicast components and links) in response to the identification signal transmitted by the routers. For example, the error identification device 14 maps and derives all of the end-to-end paths for each multicast tree $12_1$-$12_M$.

In block 56, the error identification device 14 determines the number of errors on each link $19_1$-$19_P$ for a predefined time frame (e.g., 2 hours, 4 hours, 24 hours, 7 days, etc.).

In block 58, the error identification device 14 considers every path (e.g. from the source down to the receiver) in each multicast tree $12_1$-$12_M$ to compute the cumulative number of errors for each path (which includes errors caused by the links, paths, and/or routers) in each multicast tree $12_1$-$12_M$.

In block 60, the error identification device 14 outputs the visual logical representation for each multicast tree $12_1$-$12_M$ via the user multicast component. The visual logical representation depicts the cumulative number of errors at each link and path for a predefined time frame.

In block 62, the error identification device 14 generates a web listing for each receiver impacted by the cumulative errors and sorts the receivers based on the number of errors detected per receiver. The error identification device 14 may generate the web listing into a color-coded matrix which indicates hot spots or potential problem areas for each multicast component in the multicast tree $12_1$-$12_M$ that may be generating errors which result in video tiling. The user multicast component visually displays the listing.

Figure 4:
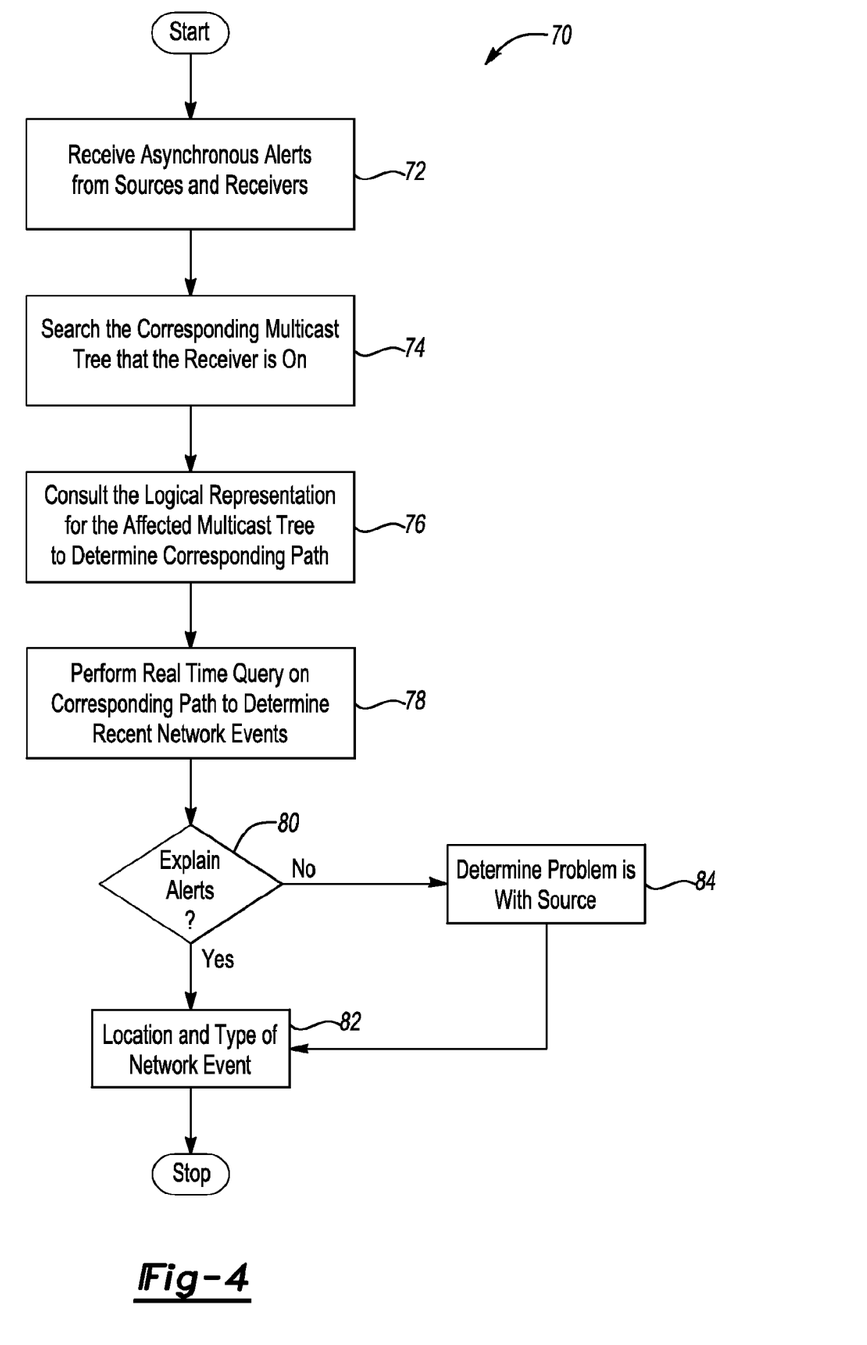
FIG. 4 depicts a method for detecting the root cause of the video tiles detected by the system of FIG. 1.

FIG. 4 depicts a method 70 for receiving alerts based on errors present in the A/V data stream. The method 70 is generally executed after the error identification device 14 generates the logical representation for each multi cast tree $12_1$-$12_M$.

In block 72, the correlation engine 72 is adapted to receive asynchronous (or event based) alerts or notifications from any one or more of the sources or receivers in the multicast trees $12_1$-$12_M$ any time such errors are detected by the sources or receivers.

In block 74, the correlation engine 22 determines which multicast tree $12_1$-$12_M$ from the logical representation of the multicast trees $12_1$-$12_M$ includes a source or receiver that detects errors associated with the A/V data stream.

In block 76, the correlation engine 22 consults the logical representation for the affected multicast tree $12_1$-$12_M$ as identified in block 74 to determine the corresponding paths from the source to each receiver for the affected multicast trees $12_1$-$12_M$.

In block 78, the correlation engine 22 performs a real-time query on the applicable paths identified in block 76 to determine if there has been any recent network events which triggered the sources or receivers to transmit the alerts as noted in connection with block 72. Such network events may include hard or soft failures. The hard failures may include fiber line cuts, xenpack failures, transport issues, or central processing unit (CPU) spikes. The soft failures may include marginal xenpack transports, loose or dirty connections, or various component overloads (e.g., such overloads may be associated with application specific integrated circuits (ASICs), line cards, or fabric fibers).

In block 80, the correlation engine 22 attempts to determine the root cause for the errors based on whether recent network events (e.g., hard or soft failures) are detectable. If a recent network event (e.g., hard or soft failure) is detected, the method 70 moves to block 82. If a recent network event cannot be detected, the method 70 moves to block 84.

In block 82, the correlation engine 22 outputs the location (e.g., link and path) and the type of network event responsible for creating the error associated with the A/V data stream via the user multicast component.

In block 84, the correlation engine 22 determines that the root cause for the errors may be attributed with a particular transmission source in the affected multicast tree $12_1$-$12_M$ or with the actual content that is flowing into a particular transmission source. In such a case, the correlation engine 22 outputs via the user multicast component that a network event was not detected and that the problem may be with a particular transmission source or the data flowing into the transmission source.

The embodiments of the present invention provide for an error identification device 14 which is capable of mapping multicast components, links, and paths for each multicast tree $12_1$-$12_M$. The error identification device 14 is further adapted to receive the state information signal and the identification signal from routers $18_1$-$18_N$ within each multi cast tree $12_1$-$12_M$ to determine the cumulative number of errors per link and the cumulative number of errors per path and to provide a logical representation of such data (e.g., such errors may be attributed to the links, paths and/or the routers). The error identification device 14 provides the logical representation of the multicast trees $12_1$-$12_M$ and the cumulative number of errors per link and path to allow service technicians to diagnose and troubleshoot problem areas based on the cumulative number of errors shown in the logical representation. In response to the error identification device 14 generating a logical representation of the multicast trees $12_1$-$12_M$, the correlation engine 22 monitors the sources $16_1$ and the receivers $20_1$-$20_O$ in real-time for error alerts associated with the transmission of the A/V data stream. In response to such alerts, the correlation engine 22 provides service technicians the ability to determine the number of errors impacting each of the multicast trees $12_1$-$12_M$ in real time before the errors associated with the transmission of the A/V data stream through the various links and paths grow into major problems. Such capability allows service technicians to troubleshoot and fix errors that may cause video tiling and may minimize exposure of the video tiling for the user.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method, comprising:
   receiving, by at least one computing device from an error-reporting device of a network, a message indicating that at least one error associated with a data stream has been detected at the error-reporting device receiving the data stream;
   determining, by the at least one computing device, a path through which the data stream is transmitted, the path being associated with the error-reporting device based on a logical representation of a multicast tree, comprising a plurality of paths, of the network;
   determining, for each link of a plurality of links of the path, a cumulative number of errors detected during each overlapping time period of a plurality of overlapping time periods having different lengths; and
   outputting data representative of the respective cumulative number of errors and the corresponding overlapping time period, of the plurality of overlapping time periods, for each link of the plurality of links of the path.

2. The method of claim 1, further comprising:
   determining a cumulative number of errors detected at each receiver, of a plurality of receivers of the network, for a predetermined time period, wherein one receiver is the error-reporting device;
   sorting the plurality of receivers based on the cumulative number of errors detected at each receiver; and
   causing an output of an indication of an error hotspot based on the sorting.

3. The method of claim 1, further comprising determining whether a link, of the plurality of links of the path, is associated with one or more error-causing events.

4. The method of claim 1, wherein the message comprises an asynchronous message sent by the error-reporting device in response to the error-reporting device detecting the at least one error.

5. The method of claim 4, further comprising:
   determining, based on the cumulative number of errors detected during each overlapping time period for each link, a cumulative number of errors detected during each overlapping time period of the plurality of overlapping time periods for the path.

6. The method of claim 1, wherein the at least one error detected at the error-reporting device is video tiling.

7. A method, comprising:
   generating, for each multicast tree of a plurality of multicast trees of a network, a logical representation of a plurality of paths in the respective multicast tree;
   receiving, by at least one computing device from an error-reporting device of the network, a message indicating that at least one error associated with a data stream has been detected at the error-reporting device receiving the data stream;
   determining a multicast tree of the plurality of multicast trees affected by the at least one error;
   determining a path of the plurality of paths of the multicast tree affected by the at least one error;
   determining, for each link of a plurality of links of the path, a plurality of cumulative number of errors respectively detecting during a plurality of overlapping time periods having different lengths; and
   outputting data representative of the respective cumulative number of errors and the corresponding overlapping time period, of the plurality of overlapping time periods, for each link of the plurality of links of the path.

8. The method of claim 7, further comprising:
   determining a cumulative number of errors detected at each receiver, of a plurality of receivers of the network, for a predetermined time period, wherein one receiver is the error-reporting device;
   sorting the plurality of receivers based on the number of cumulative errors detected at each receiver; and
   causing an output of an indication of an error hotspot based on the sorting.

9. The method of claim 7, further comprising determining whether a link, from the plurality of links of the path, is associated with one or more error-causing events.

10. The method of claim 7, wherein the at least one error is caused by one or more of a damaged communication line, a loose connection, or an overloaded device.

11. A method comprising:
    receiving, by a computing device from a receiver of a network comprising a multicast tree, an alert indicating that at least one error associated with a data stream has been detected at the receiver receiving the data stream;
    determining, by the computing device, a path through which the data stream is transmitted, the path being associated with the receiver based on a logical representation of the multicast tree comprising a plurality of paths;

determining, for each link of a plurality of links of the path, a plurality of cumulative number of errors respectively detected during a plurality of overlapping time periods having different lengths; and outputting data representative of the respective cumulative number of errors and the corresponding overlapping time period, of the plurality of overlapping time periods, for each link of the plurality of links of the path.

12. The method of claim 11, further comprising:

determining a different path that is affected by the at least one error; determining, for each link of a plurality of links of the different path, a different plurality of cumulative number of errors respectively detected during the plurality of overlapping time periods; and outputting data representative of the different plurality of cumulative number of errors.

13. The method of claim 11, further comprising:

determining, based on the plurality of cumulative number of errors respectively detected during the plurality of overlapping time periods for each link, a plurality of cumulative number of errors detected on the path.

14. The method of claim 11, further comprising:

determining a cumulative number of errors detected at each receiver, of a plurality of receivers of the network, for a predetermined time period;

sorting each receiver of the network based on the cumulative number of errors detected at each receiver for the predetermined time period; and causing an output of an indication of an error hotspot based on the sorting.

15. The method of claim 14, wherein the indication of the error hotspot is a color-coded listing of each receiver of the network.

16. The method of claim 11, further comprising:

determining whether an event causing the at least one error occurred on the path; and in response to determining that the event occurred on the path, causing an output of a location of a link, of the plurality of links of the path, that is responsible for creating the at least one error.

17. The method of claim 16, wherein the event is a damaged communication line.

* * * * *